INVENTOR
Karl Erik Kylén
BY
HIS ATTORNEY

Aug. 12, 1941.  K. E. KYLÉN  2,252,186
TWO-STROKE INTERNAL COMBUSTION ENGINE
Filed Feb. 18, 1939  3 Sheets-Sheet 3

INVENTOR:
Karl Erik Kylén
BY Chas. Lyon Russell
HIS ATTORNEYS.

Patented Aug. 12, 1941

2,252,186

UNITED STATES PATENT OFFICE 2,252,186

TWO-STROKE INTERNAL COMBUSTION ENGINE

Karl Erik Kylén, Goteborg, Sweden, assignor to Aktiebolaget Svenska Kullagerfabriken, Goteborg, Sweden, a corporation of Sweden Application February 18, 1939, Serial No. 257,036
In Sweden February 24, 1938

1 Claim. (Cl. 123—65)

The present invention consists in improvements in or relating to two-stroke internal combustion engines and has for its object to improve the scavenging of the waste products from the engine cylinder after combustion has taken place and as soon as the pressure in the cylinder, owing to the exhaust of the combustion products, becomes lower than the pressure of air or gas mixture which is to be introduced into the cylinder for a succeeding charge.

The invention is applied to that type of engine in which there is provided in the cylinder head valves which open into the cylinder and through which air or gas is introduced. The valves are conveniently situated between the cylinder and a chamber for the air or gas and preferably the valves are so guided or controlled that they open automatically when the pressure in the chamber is greater than the pressure within the cylinder.

Advantages accruing from an engine of this type are—

(1) The scavenging of the cylinder or the introduction of fresh gas or gas mixture can take place in a shorter time as compared with the time occupied in scavenging the cylinder of a two-stroke engine operating without a gas chamber and valve controlled ports between it and the cylinder. Consequently the exhaust ports can be situated substantially lower in the cylinder than in ordinary two-stroke engines in which the fresh gas or gas mixture is introduced directly into the cylinder. For example, an engine having a cylinder volume 350 ccs. constructed in accordance with the type of engine to which the present invention relates shows a 35% greater efficiency at 2000 revolutions per minute with an exhaust port having only 6 mm. width in the axial direction as compared with two-stroke engines not furnished with the valve controlled supply system. That is to say, the width in the axial direction of the exhaust ports in the present type of engine is only about one-third of the corresponding width that would otherwise be necessary with the older type of engine. The width of the exhaust ports in the axial direction of the cylinder is preferably less than 12% of the stroke of the piston.

(2) The smallness in the above-mentioned dimension of the exhaust ports provides increased efficiency as the working stroke of the engine is increased in length and a smaller quantity of air or gas mixture is permitted to escape through exhaust ports at the time of scavenging.

(3) The degree of mixing between the incoming gas or gas mixture and the exhaust gases is reduced during the scavenging period.

(4) There is reduction in fuel consumption especially at low and medium speeds.

Hereinafter and in the appended claims the expression "a two-stroke engine of the type described" will be used to indicate a two-stroke engine having an admission chamber into which air, gas or gas mixture is introduced from a supply and from which the air, gas or gas mixture passes into the top of the engine cylinder through valve controlled ports whereof the valves preferably operate automatically when the pressure within the engine cylinder is reduced sufficiently below that obtaining in the admission chamber.

According to the present invention a two-stroke engine of the type described has a combustion chamber (formed separately from or constituted by the upper part of the cylinder) so formed and has the admission valves so disposed that part of the gaseous material admitted into the cylinder or combustion chamber by the valves is directed on to the walls of the cylinder or combustion chamber respectively in such a manner that the gaseous material is deflected in a direction towards the cylinder axis.

In order that the invention may be more clearly understood preferred examples will now be described with the aid of the accompanying drawings, in which—

Like reference numerals indicate like parts in the several figures of the drawings.

Figure 1:
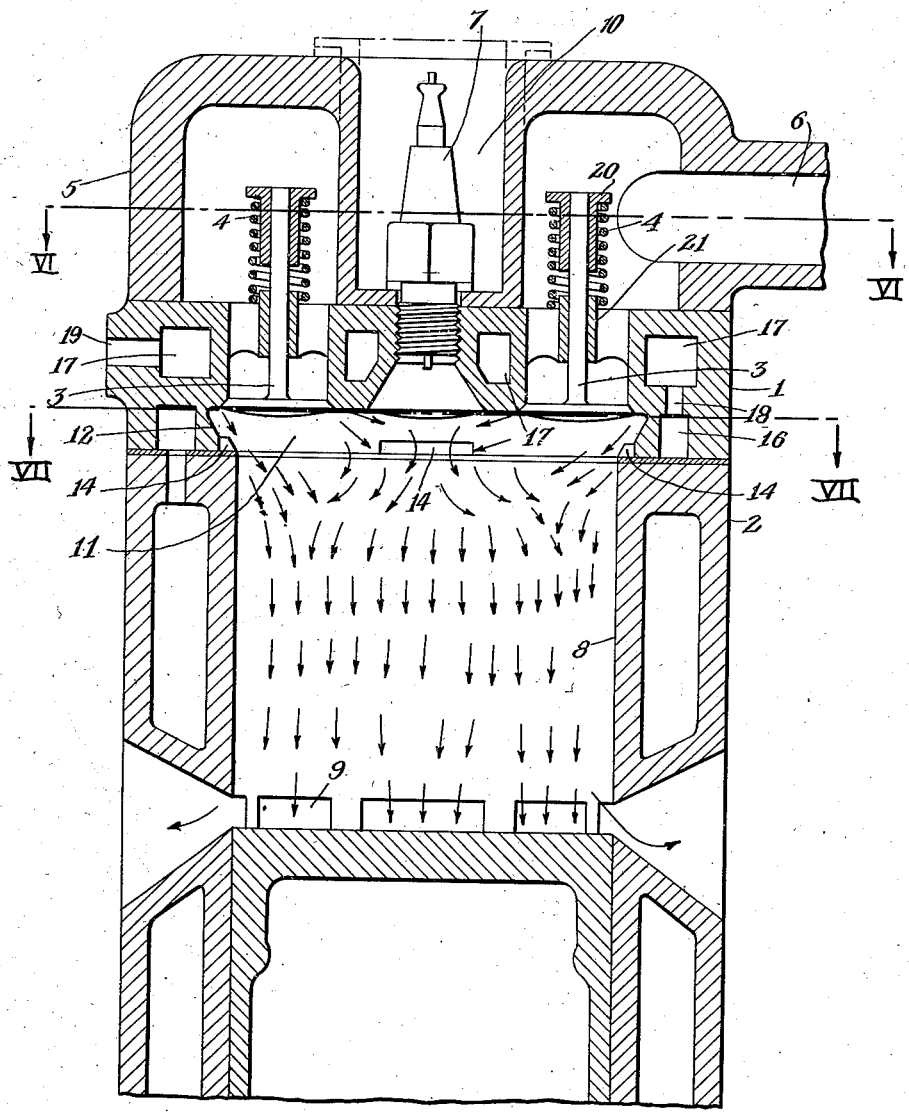
Figure 1 shows a longitudinal section containing the axis of an engine cylinder and illustrates the admission chamber, valve housing, combustion chamber and the upper part of the cylinder.

Referring first of all to Figure 1, a valve housing 1 is mounted on the top of the engine cylinder 2. In the valve housing are provided a number of self-acting valves 3, that is to say, valves which act automatically to admit the gaseous mixture when pressure in the engine cylinder is reduced sufficiently below pressure in the admission chamber. The valves are held pressed on to their seats by springs 4 and surmounting the valve housing chamber 1 is the admission chamber 5. Into the latter air, gas or gas mixture is introduced through a channel 6 from a compressor, scavenging pump or the like, the compressor or its equivalent not being illustrated in the drawings. The crankcase which also is not illustrated can be utilised as a compressor or scavenging pump in well known manner.

The admission chamber 5 is formed internally of substantially cylindrical form and the admission port 6 is so formed that the air, gas or gas mixture can be introduced more or less tangentially into the chamber in order to improve as far as possible the gas mixture. Owing to the fact that the admission chamber 5 is directly above the valves, the air, gas or gas mixture has a direct flow through the ports controlled by valves 3 thereby reducing gaseous friction losses as much as possible during the period of admission of the air or gases into the cylinder. Preferably, the cross-sectional area of the admission chamber 5 should be as great or greater than that of the engine cylinder so that the admission chamber extends completely over the area of the cylinder head.

In the valve housing 1 the valves 3 are preferably symmetrically located around the axis of the cylinder and also around a centrally disposed spark plug 7 or equivalent ignition device. In the case, however, in which the engine is intended to operate with a direct injection of fuel, air will be admitted from the admission chamber past valves 3 and fuel will be introduced into the cylinder through an injection nozzle which will be utilised in place of the spark plug 7.

Figure 4:
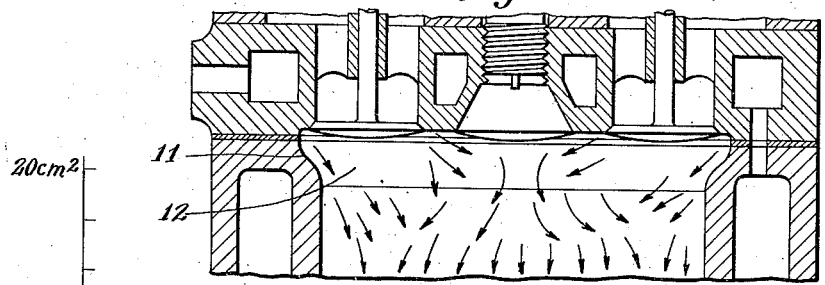

By spacing the valves 3 evenly around the axis of the cylinder the air or gas mixture entering the cylinder past those valves will flow at substantially equal speeds through each of the admission ports, thus charging the cylinder uniformly over its whole area. In order to prevent the scavenging air or gas mixture from obtaining a greater speed nearer the cylinder wall than it will have at positions nearer the axis of the cylinder, the combustion chamber, which in the illustration is constituted by the lower part of the valve housing, is specially formed as shown in any one of the examples illustrated, as will be described below. By the special formation of the combustion chamber, which as shown in Fig. 4 alternatively may be constituted by the upper part of the cylinder, the direct passage of air or gas mixture to the exhaust ports 9 close to the wall of the cylinder is minimised and in consequence incomplete scavenging is substantially obviated and fuel economy obtained.

Figure 2:
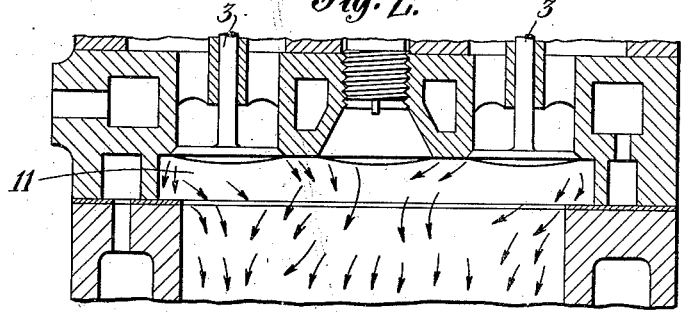
Figures 2, 3 and 4 are similar sections illustrating modifications in construction.

In order to obtain these advantages the combustion chamber 11, which as stated above may be integral with the valve housing or with the cylinder head, is of substantially circular cross-section but in the form illustrated in Figure 1 is formed with a conical wall 12 which is divergent upwardly. In Figure 2 the diameter of the combustion chamber 11 is greater than that of the cylinder so that a shoulder is provided at the junction of the lower part of the combustion chamber and the upper edge of the cylinder, and in Figure 3 the wall of the combustion chamber is curved to have a more or less toroidal curvature instead of having the conical form of Figure 1 or the cylindrical form of Figure 2. In each case the wall of the combustion chamber is of larger diameter at some portion of its height than the diameter of the top of the cylinder and the effect is to impart to that portion of the air or gas mixture adjacent the wall of the combustion chamber a movement in a direction towards the axis of the cylinder as it enters the latter. This portion of the air or gas mixture commingling as it will with the other portion directed into the cylinder nearer the axis will result in a substantially uniform flow of air or gas mixture into and down through the cylinder so that the velocity of the air or gas mixture is rendered more or less uniform over the whole cross-section of the cylinder. In consequence the scavenging of the waste products from the cylinder is improved.

Figure 3:
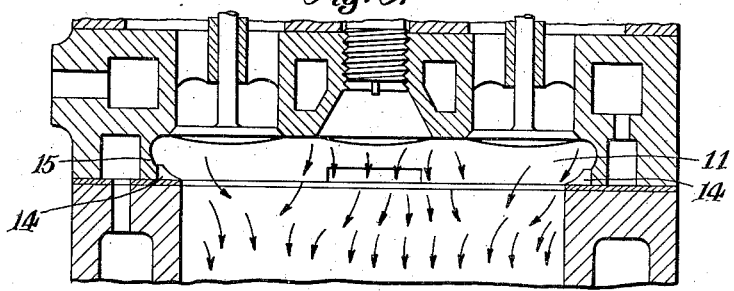

In order to facilitate the mounting of the valves there are formed, as shown in Figures 1 and 3, small recesses 14 in the wall of the combustion chamber in the valve housing. Thus, the valves can be easily directed on to their seats from the inner side of the combustion chamber without any risk of damage from the valve stems as they are passed into their guides. This will not be necessary in the form of the invention illustrated in Figure 4 in which the combustion chamber is formed separate from the valve housing. The sloping walls can therefore be completely circular in form. The valves should be made light in weight so that the opening and closing periods will be as short as possible. For high speed engines a light metal having appropriate qualities of strength such as duralumin or the like is suitable. Steel valves may also be used with advantage for engines having a speed of 3000 to 4000 R. P. M. For engines having higher speeds valves of lighter metal are preferable, their closing and opening periods being about 60% of that of steel valves of the same size.

In order to cool the valve housing and combustion chamber, cooling channels 16 and 17 are provided of which the channel 16 is connected with the cooling jacket of the engine cylinder as shown on the left-hand side of Figures 1, 2 and 3, and the channels 16 and 17 are interconnected by a passage 18 as shown on the right-hand side of the drawings. The cooling water outlet is afforded at 19, the inlet to the cylinder jacket not being shown. Alternatively, the outlet 19 may be the inlet if the water flow is desired to take place in the opposite direction. By means of these cooling channels effective cooling of the valve and the spark plug is obtained, the inner annular channel 17 being connected with the outer channel at a suitable position or positions.

The spark plug 7 for the injection nozzle, which may be situated in a similar position, is located in a cylindrical recess 10 provided in the admission chamber 5 so that it is accessible from the outside of the chamber without removing the chamber itself. Alternatively, the cylindrical recess 10 may be provided in a separate cylinder formed and fitted as indicated in chain-lines so that it is entered into a central aperture in the top wall of the admission chamber.

Valves located in the valve housing in the type of engine to which the present invention is applied provide a larger port area for admission of air or gas mixture than is the case of those engines in which such valves are not provided. This presupposes, of course, that the number of valves is sufficient to give the desired aggregate port opening. In the case of one or at most two valves the present type of engine does not give material advantage over the ordinary type of two-stroke engine in which such valves are not provided. In consequence, and in order to reduce the weight of the individual valves, their number should be at least three; and with three or more valves a considerable advantage is obtained, especially with engines having below 3000 to 4000 R. P. M. This is shown by the curves in Figure 5 which is a diagram of a two-stroke engine built for test with the following dimensions:—

The axial width of the outlet ports 9 is 6 mm. and the length of the stroke 75 mm. Curve 22 is made out on the basis of an engine operating at 2000 R. P. M. The ports 9 are opened during 72° of crank movement. The weight of each valve is 8 grammes. The tension of the valve springs is 0.4 kg. and the scavenging pressure 0.4 kg./cm.$^2$. Six valves such as 3 were provided.

By comparison, curve 23 indicates the opening integration for an engine of similar size with the ordinary scavenging system in which the air or gas mixture is introduced directly into the top of the cylinder without the aid of valves such as 3, and chamber such as 5. In this case the axial width of the inlet port was 12 mm. and the corresponding width of the outlet port 18 mm.

Figure 5:
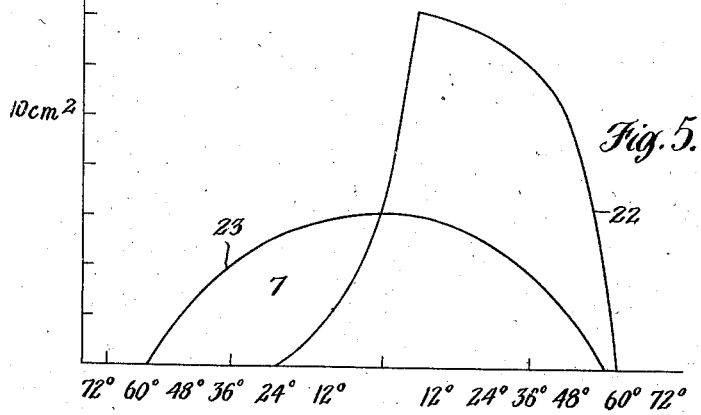
Figure 5 is a valve opening diagram.
Figure 6:
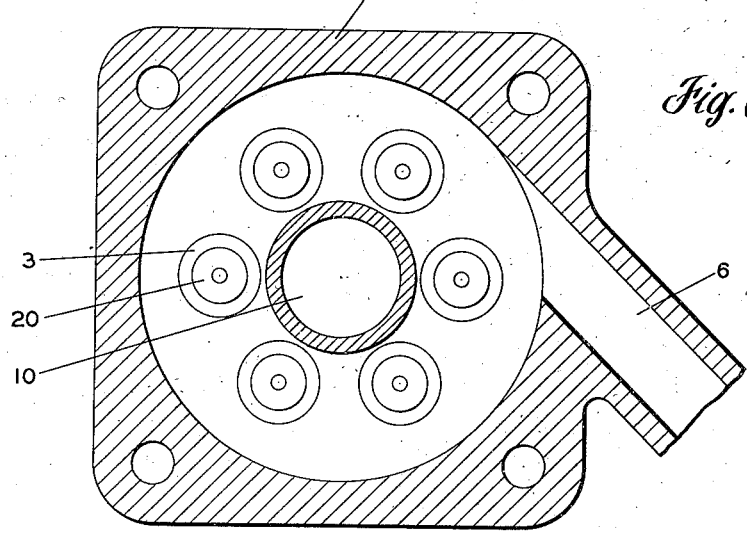
Figure 6 is a cross section of Figure 1 taken at about the line VI—VI looking downwardly.
Figure 7:
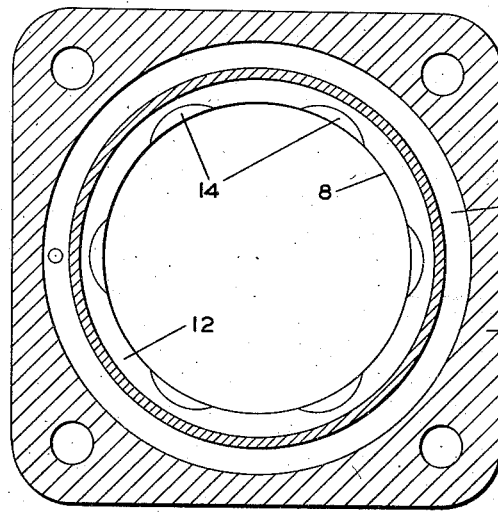
Figure 7 is a section of Figure 1 taken at about the line VII—VII looking downwardly.
Figure 8:
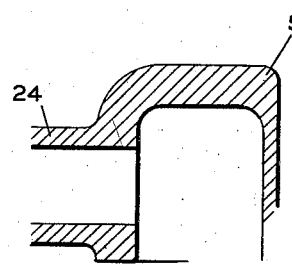
Figure 8 is a section of the upper left hand corner of Figure 1 showing a modification.

As shown in Figure 5 the opening integration of the valve scavenged engine is about 40% greater than for an engine with the illustrated type of scavenging system. In both cases the same carburetter and the same gas supply arrangement to the crank case were utilised and it was found that the valve scavenged engine constructed according to this invention developed 7.5 H. P., as compared with the other engine which developed only 5.5 H. P.

The valve springs 4 must not have so great a tension that the work required for compressing the springs is equal to or greater than the kinetic energy of the valves as if this condition is not observed an unnecessarily high pressure of air or gas mixture or scavenging air would result.

The opening movement of the valves is limited by the sleeve 20 which is preferably pressed or threaded on to the valve stem and serves as a stop to limit the movement of the valve. During the running of the engine each sleeve will strike against the upper end of the valve bush or guide 21. Weak valve springs which must necessarily be used in order to avoid a too high scavenging pressure, would soon break if the springs were permitted to become so deformed that the spring convolutions are forced into contact with one another. During the tests made in the production of the diagram according to Figure 5 it was found that the valves, when the engine was operating at full load, must be limited in their movement by the sleeve arrangement above described.

At certain speeds the kinetic energy of the exhaust gases causes a partial vacuum in the cylinder. This partial vacuum can be used for scavenging the cylinder or for replenishing it with gas mixture. For this purpose an extra air inlet 24 is required which has been indicated in chain-lines in Figure 1. A carburetter can be connected to this inlet. When starting the engine so fitted, air or gas mixture must first be introduced through channel 6 from the crank case or from a compressor and when the engine has attained the required speed at which the kinetic energy of the exhaust gases causes a partial vacuum in the cylinder, the channel 6 can be closed and admission of air or gas mixture can then be made through inlet 24.

The invention is not restricted to the details of construction described hereinbefore. For instance, the number of the valves 3 may be varied to suit requirements and the valves can be mechanically operated for opening and closing instead of the automatic arrangement described above.

Having now particularly described and ascertained the nature of my invention and in what manner the same is to be performed, I declare that what I claim is:

A two-stroke internal combustion engine having a cylinder and a combustion chamber communicating therewith, there being a circular admission chamber communicating with said combustion chamber through valve controlled ports, a plurality of self-acting valves for closing and opening said ports, said valves being arranged about and substantially equidistant from the axis of the admission chamber, means for introducing gas and air to said admission chamber, said means comprising an inlet conduit leading into the admission chamber and opening tangentially thereinto for the purpose of causing rotation of the gas mixture in the chamber around the axis thereof.

KARL ERIK KYLÉN.